United States Patent
Choi et al.

(10) Patent No.: US 11,928,969 B2
(45) Date of Patent: Mar. 12, 2024

(54) METHOD FOR DISPLAYING CORRIDOR AND PATH OF UNMANNED VEHICLE USING POINT CLOUD

(71) Applicant: CLROBUR CO., LTD, Incheon (KR)

(72) Inventors: Tae In Choi, Incheon (KR); Seong Won Jo, Incheon (KR)

(73) Assignee: CLROBUR CO., LTD, Incheon (KR)

( * ) Notice: Subject to any disclaimer, the term of this patent is extended or adjusted under 35 U.S.C. 154(b) by 0 days.

(21) Appl. No.: 17/892,332

(22) Filed: Aug. 22, 2022

(65) Prior Publication Data

US 2023/0298472 A1 Sep. 21, 2023

(51) Int. Cl.
*G08G 5/00* (2006.01)
*G08G 5/04* (2006.01)

(52) U.S. Cl.
CPC ............ *G08G 5/0026* (2013.01); *G08G 5/003* (2013.01); *G08G 5/006* (2013.01); *G08G 5/0069* (2013.01); *G08G 5/0091* (2013.01); *G08G 5/045* (2013.01)

(58) Field of Classification Search
CPC ...... G08G 5/0026; G08G 5/003; G08G 5/006; G08G 5/0069; G08G 5/0091; G08G 5/045
See application file for complete search history.

(56) References Cited

U.S. PATENT DOCUMENTS

| | | | |
|---|---|---|---|
| 10,928,830 B1* | 2/2021 | Tran | G06N 3/045 |
| 2013/0194126 A1* | 8/2013 | Paoletti | G01S 13/87 342/55 |
| 2017/0193830 A1* | 7/2017 | Fragoso | G08G 5/0069 |
| 2018/0267562 A1* | 9/2018 | MacCready | G08G 5/0008 |
| 2019/0064794 A1* | 2/2019 | Chen | G05D 1/106 |
| 2020/0215695 A1* | 7/2020 | Cristache | G06N 5/04 |

FOREIGN PATENT DOCUMENTS

| | | |
|---|---|---|
| JP | 2018165932 A | 10/2018 |
| KR | 10-2020-0028210 A | 3/2020 |

OTHER PUBLICATIONS

Kyuman Lee et al., "Incorporation of Potential Fields and Motion Primitives for the Collision Avoidance of Unmanned Aircraft", Applied Sciences, 2021, pp. 1-19.

* cited by examiner

*Primary Examiner* — Behrang Badii
(74) *Attorney, Agent, or Firm* — NKL LAW; Jae Youn Kim

(57) ABSTRACT

A method of displaying a corridor for an unmanned vehicle using a point cloud. The method includes: displaying the space vector points in a preset 3-dimensional space; and generating and displaying individual corridors, each individual corridor connecting between selected space vector points from among the space vector points. Each of the space vector points includes location information and size information, the individual corridor is displayed by a stereoscopic structure including an internal space in which the unmanned vehicle can fly, and the form of the individual corridor is determined based on the size information of a pair of adjacent space vector points.

10 Claims, 15 Drawing Sheets

METHOD FOR DISPLAYING CORRIDOR AND PATH OF UNMANNED VEHICLE USING POINT CLOUD

CROSS-REFERENCE TO RELATED APPLICATION

This application claims priority to and the benefit of Korean Patent Application No. 10-2022-0034105, filed on Mar. 18, 2022, the disclosure of which is incorporated herein by reference in its entirety.

BACKGROUND

1. Field of the Invention

The present invention relates to a method of displaying a corridor and a path for an unmanned vehicle using a point cloud.

2. Discussion of Related Art

A ground control system is a system that controls a flight of an unmanned vehicle such as a drone, and most ground control systems are operated based on a 2-dimensional (2D) map. That is, when a specific point on the 2-dimensional map is designated by a user input, a path through which the unmanned vehicle flies is determined or a height at which the unmanned vehicle flies is set.

However, due to the characteristics of the 2-dimensional map, there is a limit to displaying actual environment information and flight information of the unmanned vehicle by a 3-dimensional (3D) user's point of view. In addition, when a specific point is designated according to a user input, there is a possibility that an error in determining the altitude of the corresponding point may occur.

SUMMARY OF THE INVENTION

An object of the present invention, devised to solve the above problems, is to provide a method of displaying a corridor for an unmanned vehicle capable of intuitive recognition of a flight environment of the unmanned vehicle by 3-dimensionally displaying the corridor for the unmanned vehicle by using a point cloud disposed in a 3-dimensional airspace.

In addition, another object of the present invention is to provide a method of displaying a corridor for an unmanned vehicle, which is capable of visualizing and providing information on a 3-dimensional airspace to a user through a plurality of space vector points arranged in the corresponding airspace.

In addition, another object of the present invention is to provide a method of displaying a path for an unmanned vehicle, which enables a various selection of flight paths of the unmanned vehicle by simultaneously generating multiple paths in a three-dimensional airspace.

In addition, another object of the present invention is to provide a method of displaying a path for an unmanned vehicle, which allows for detecting obstacles located in a traveling direction of a flight path, generating an avoidance path, and verifying and simulating the generated flight path, thereby providing a safe flight path and preventing a collision accident of the unmanned vehicle in advance.

A method of displaying a corridor for an unmanned vehicle using a point cloud according to an embodiment of the present invention provide a method of displaying a corridor for an unmanned vehicle using a point cloud including a plurality of space vector points. The method may include: displaying the space vector points in a preset 3-dimensional space; and generating and displaying individual corridors, each individual corridor connecting between selected space vector points from among the space vector points, wherein each of the space vector points may include location information and size information, the individual corridor may be displayed by a stereoscopic structure including an internal space in which the unmanned vehicle can fly, and a form of the individual corridor may be determined based on the size information of a pair of adjacent space vector points.

In addition, the form of the individual corridor may be determined as one of a first form in which a cross-sectional area is increased, a second form in which the cross-sectional area is maintained constant, and a third form in which the cross-sectional area is decreased.

In addition, the individual corridors may include a first end and a second end connected to the pair of adjacent space vector points, the size of the first end of the individual corridor may be determined corresponding to size information of a space vector point to which the first end is connected, and the size of the second end of the individual corridor may be determined corresponding to size information of a space vector point to which the second end is connected.

In addition, each of the space vector points may be displayed by a sphere having a diameter corresponding to the size information.

In addition, an outer peripheral surface of the individual corridor may be constituted of a set of tangent lines connected between the pair of adjacent space vector points.

In addition, an outer circumferential surface of the individual corridor may be constituted of a set of straight lines connected between the first end and the second end.

In addition, each of the space vector points may be displayed by a stereoscopic shape having a size that matches the size information or is displayed by a stereoscopic shape having a size corresponding to a certain ratio of the size information.

In addition, each of the space vector points may further include weather information, and the size information may be calculated corresponding to the weather information and may be periodically updated in response to a change in the weather information.

In addition, the weather information may include wind speed information and wind direction information, and a visualization element indicating the wind speed information and the wind direction information may be displayed in at least one of the space vector points.

In addition, the 3-dimensional airspace may includes a first area and a second area, and a spacing between the space vector points disposed in the first area and a spacing between the space vector points disposed in the second area may be set differently.

In addition, the 3-dimensional airspace may include the first area and the second area, and colors of at least one space vector point disposed in the first area and at least one space vector point disposed in the second area may be are set differently.

In addition, the method may further includes changing at least one of the sizes, the spacings, and the colors of the space vector points located in at least a partial area of the 3-dimensional airspace.

In addition, each of the space vector points may include an occupancy time and an occupancy duration by the unmanned vehicle, and identification information of the unmanned vehicle.

A method of displaying a corridor for an unmanned vehicle using a point cloud according to an embodiment of the present invention provides a method of displaying a corridor for an unmanned vehicle using a point cloud including a plurality of space vector points. The method may include: displaying the space vector points in a preset 3-dimensional airspace; and displaying the corridor of the unmanned vehicle including n space vector points from among the space vector points and n−1 individual corridors connected between the n space vector points, where n is an integer greater than or equal to 3, wherein each of the space vector points may include location information and size information, a form of an n−2th individual corridor among the n−1 individual corridors may be determined corresponding to the size information of an n−2th space vector point and an n−1th space vector point among the n space vector points, and a form of an n−1th individual corridor among the n−1 individual corridors may be determined corresponding to the size information of the n−1th space vector point and an nth space vector point among the n space vector points.

In addition, each of the space vector points may further includes weather information, and the size information may be calculated corresponding to the weather information and is periodically updated in respond to a change in the weather information.

In addition, the weather information may include wind direction information and wind speed information.

A method of displaying a path for an unmanned vehicle using a point cloud according to an embodiment of the present invention may include: defining a point cloud-based 3-dimensional airspace for generating a flight path of an unmanned vehicle; and generating and displaying the flight path of the unmanned vehicle using the point cloud in the 3-dimensional airspace, wherein the point cloud may be constituted of a plurality of space vector points including information affecting movement of the unmanned vehicle, the flight path may be generated based on selected space vector points from among the space vector points and an individual corridor connecting between the selected space vector points, and a form of the individual corridor may be determined based on size information of a pair of adjacent space vector points.

In addition, said defining the 3-dimensional airspace may include: collecting location data for a path generation area in which the flight path of the unmanned vehicle is to be generated; determining a range of the path generation area based on the collected location data; defining a 3-dimensional airspace in which the point cloud is disposed based on the determined range of the path generation area; changing characteristics of the point cloud according to surrounding environment of the 3-dimensional airspace or a user request; and rendering the 3-dimensional space.

In addition, said changing characteristics of the point cloud may include: changing at least one of sizes, spacings, positions, and colors of the space vector points constituting the point cloud. In addition, said generating and displaying the flight path of the unmanned vehicle may include: selecting a starting point from among the space vector points in the 3-dimensional airspace; predicting a flightable area based on the information of the selected starting point and size information of the unmanned vehicle; selecting a corridor constitution type and an obstacle avoidance type; and constituting a plurality of corridors based on information on the space vector points located within the flightable area.

In addition, said selecting a corridor constitution type and an obstacle avoidance type may include: selecting any one of a user-selectable type and an automated type as the corridor constitution type in order to constitute the corridor for the flight path of the unmanned vehicle; and selecting any one of a corridor type and a curve type as the obstacle avoidance type in order to constitute an avoidance path upon a detection of an obstacle in a traveling direction of the flight path.

In addition, said selecting an obstacle avoidance type includes: upon the detection of the obstacle in the traveling direction of the path when the corridor type is selected, constituting the path by allowing it to be deflected to other space vector point around it, and upon the detection of the obstacle in the traveling direction of the path when the curve type is selected, constituting the path by allowing it to be deflected to an interpolation point by a Bezier curve.

In addition, the method may further include: verifying paths corresponding to the plurality of the constituted corridors and simulating a flight path pursuant to speed and time of the unmanned vehicle; and outputting all corridors based on the verification and simulation results for the plurality of the corridors, and storing output information for the corridors in a database, wherein said simulating a flight path may be: displaying a virtual path image and a virtual unmanned vehicle image for each path of the plurality of the corridors, and displaying a location of the virtual unmanned vehicle image while varying the position based on a flight plan pursuant to the speed and time of the unmanned vehicle set for each path.

DETAILED DESCRIPTION OF EXEMPLARY EMBODIMENTS

Figure 1:
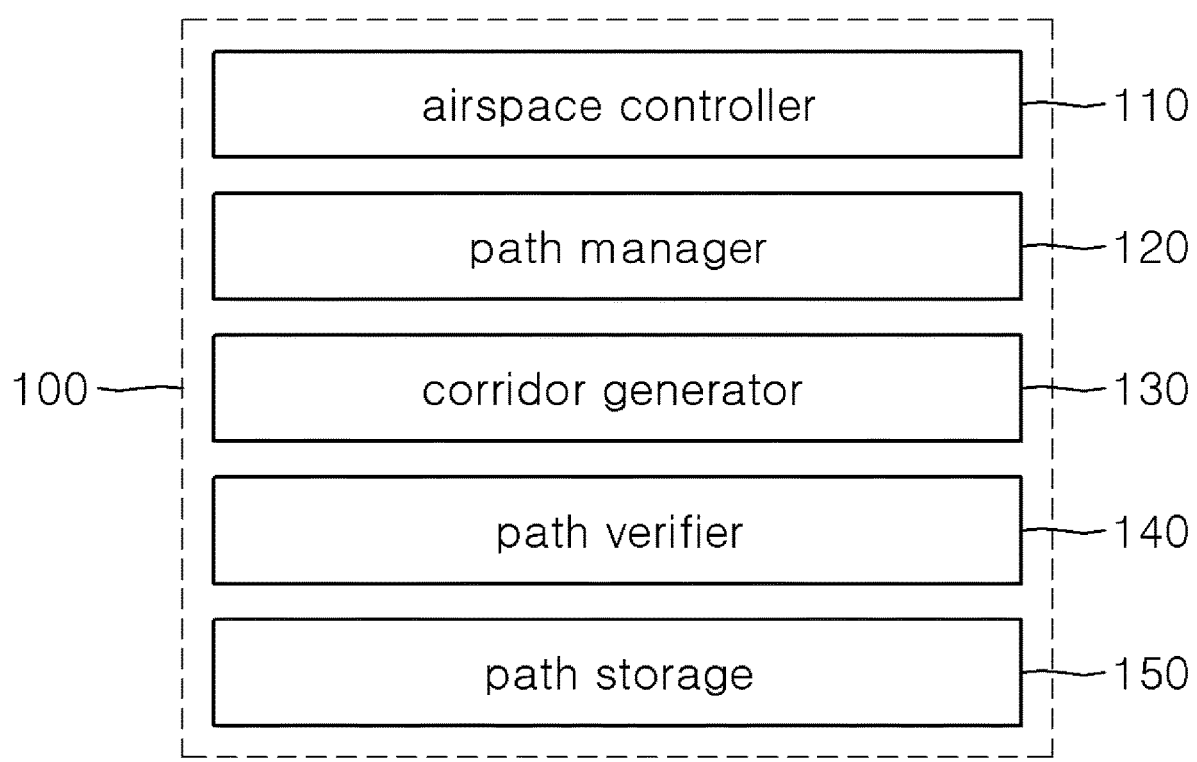
FIG. 1 is a diagram illustrating a system according to an embodiment of the present invention.

Hereinafter, embodiments related to the invention, which are illustrated in the drawings, will be described specifically through detailed description. However, the invention is not limited to the embodiments disclosed below, but may be implemented in various different forms. It should be understood that the invention includes all modifications, equivalents, and substitutes included in the spirit and scope of the invention.

Terms, such as first, second, A, B, (a), and (b), may be used to describe various configuration elements. These terms are used only for the purpose of distinguishing one configuration element from another configuration element, and do not limit the essence, sequence, or order of the corresponding configuration elements. Additionally, when one configuration element is described herein as being "connected", "coupled" or "contacted" to another configuration element, the one configuration element may be directly connected to, coupled to, or contacted to the other configuration element, and, however, it should be understood that still another configuration element may be "connected", "coupled" or "contacted" therebetween. In the case of being "connected", "coupled" or "contacted", it may be understood as being physically "connected", "coupled" or "contacted" as well as being electrically "connected", "coupled" or "contacted" as needed.

The term, such as "~part (unit)", "~er", "~element", "~module", or the like, described in this specification refers to a unit for processing at least one function or operation, which may be embodied by hardware, software, or a combination of hardware and software. Additionally, in the present specification, the term, such as "include", "comprise", "have", or the like, is intended to designate existence of a corresponding configuration element, and thus should be construed as having the possibility of existence or addition of other configuration element without excluding it, unless expressly stated to the contrary.

And it should be noted that the classification of the configuration parts in the present specification is merely a division according to a main function which each configuration part is responsible for. That is, two or more configuration parts to be described below may be combined into one configuration part, or one configuration part may be divided into two or more configuration parts according to more subdivided functions. And each of the configuration parts to be described below may additionally perform some or all of the functions of other configuration elements in addition to the main function which it is responsible for, and of course, some of the main functions that each of the configuration parts is responsible for may be exclusively performed by another configuration part.

Hereinafter, a method of displaying corridors and paths for unmanned vehicles using a point cloud according to an embodiment of the present invention will be described with reference to drawings related to embodiments of the present invention.

FIG. 1 is the diagram showing a system according to an embodiment of the present invention.

Referring to FIG. 1, a system 100 according to an embodiment of the present invention may include an airspace controller 110, a path manager 120, and a corridor generation unit 130. Additionally, the system further includes a path verifier 140 and a path storage 150. The system 100 may display corridors and flight paths for unmanned vehicles using a point cloud through the above-described components on a user terminal or a display device.

The airspace controller 110 may define a 3-dimensional airspace in which a flight path of an unmanned vehicle is displayed.

To this end, the airspace controller 110 may collect position data capable of determining a range of the 3-dimensional airspace. For example, the airspace controller 110 may receive location data for the 3-dimensional airspace directly from a user or from a separate Geographic Information System (GIS).

Location data for the 3D airspace is defined as data that may specify a location and range of the 3D airspace, and for example, it may be provided in the form of a coordinate system or an administrative district (e.g., a city, a province, a district, a county, etc.).

In addition, the airspace controller 110 may generate and dispose the point cloud within a preset 3-dimensional airspace when the 3-dimensional airspace is set. In this case, the point cloud may be defined as a set of a plurality of space vector points.

The space vector points are visualized and displayed by a stereoscopic shape within the 3-dimensional airspace, and each space vector point may include identification information, location information, weather information, and size information.

For example, the identification information is information given to each space vector point to identify the space vector point, and the location information includes latitude, longitude, and altitude (e.g., absolute altitude and/or relative altitude) capable of specifying the location of the space vector point.

Weather information means information at a place where the space vector point is located, and such weather information may be obtained from an external database with reference to the location information of the space vector points. In addition, the weather information may be periodically updated according to the passage of time.

For example, the weather information includes information (e.g., value, duration, amount, degree, direction, etc.) about temperature, humidity, rain, snow, fog, hail, typhoon, thunder, lightning, gust, yellow sand, wind, fine dust, etc. Among them, wind speeds and wind directions may be managed as sensitive weather information.

Information on the wind speeds and the wind directions, which are sensitive weather information, may be visualized and displayed on the space vector points. For this purpose, visualization elements indicating the wind speeds and the wind directions may be displayed on the space vector points.

For example, the visualization elements may be displayed by a stereoscopic shape in which their lengths and directions may vary, and the lengths and directions may vary according to the wind speeds and directions.

The size information is information indicating sizes of space vector points displayed in the stereoscopic shape. For example, when the space vector points are displayed by a sphere shape, the size information may be defined as diameters of the space vector points. When the space vector points are displayed by a hexahedron shape, the size information may be defined as a horizontal length, a vertical length, and a height of the respective space vector points. However, the form of the size information is not limited thereto, and may be transformed into various forms depending on the shapes of the space vector points.

In this case, the airspace controller 110 may determine a visualization size of each of the space vector points according to size information of the space vector points. For example, the airspace controller 110 may display the space vector point by a stereoscopic shape having a size matching the size information without processing the size information, or display the space vector point by a stereoscopic shape having an enlarged or reduced size compared to the size information by applying a certain ratio to the size information.

In addition, the size information may be calculated corresponding to the weather information, and may be periodically updated in response to a change in the weather information. For example, the size information may be calculated corresponding to the wind speed and the wind direction, which are sensitive weather information, and additionally, the size and speed of the unmanned vehicle may be considered as additional factors. In this case, information on the size of the space vector point may be calculated according to a following function form.

$$M = F(a,b,c,d)$$

Here, M is the size information of the space vector point, 'a' is the wind speed, 'b' is the wind direction, 'c' is the size of the unmanned vehicle, and 'd' is the speed of the unmanned vehicle. Meanwhile, each of the space vector points may further include obstacle information, regulatory information, and occupancy information by the unmanned vehicle.

For example, the obstacle information may include information about whether an obstacle (e.g., a fixed obstacle, a temporary obstacle, etc.) exists at a place where the space vector points are located, and information (e.g., a building, a terrain, occupation of other unmanned vehicles, unexpected situations, whether or not to fly, etc.) about the types of the obstacle. The regulatory information may include information on whether a place where the space vector points are located is set as a no-fly zone or a permitted flying zone.

The occupancy information by the unmanned vehicle includes the occupancy time and the occupancy duration during which the unmanned vehicle occupies the space vector point, and information (e.g., identification information, type, size, weight, speed, etc.) on the unmanned vehicle occupying the corresponding space vector point.

On the other hand, information (e.g., identification information, location information, weather information, size information, obstacle information, regulatory information, occupancy information by the unmanned vehicle, etc.) included in the space vector points may be displayed in more detail in response to the user input. For example, when the user selects a specific space vector point for which detailed information is to be inquired using an input means (e.g., a mouse, etc.), information of the selected space vector point may be displayed in the form of text, graph, picture, etc.

As an example, in the case of information that changes according to the passage of time (e.g., weather information, obstacle information, occupancy information by the unmanned vehicle, etc.), the corresponding information may be displayed for each time period.

The spacing of the space vector points arranged in the 3-dimensional airspace may be formed by an initially set value or may be determined by a preset algorithm. For example, the spacing of the space vector points may be changed by reflecting the surrounding environment such as a terrain feature located in the 3-dimensional airspace. In addition, the spacing of the space vector points may be adjusted in response to a user input.

Also, colors of the space vector points may be set differently. For example, the colors of the space vector points may be changed by reflecting at least one of weather information, size information, obstacle information and regulatory information of the space vector points, and occupancy information by the unmanned vehicle.

In other words, by changing the spacing and/or color of the space vector points according to the surrounding environment or the characteristics of the space vector points, the characteristics of the 3-dimensional airspace can be more intuitively conveyed to the user.

The path manager 120 may predict (or detect) a flightable area of the unmanned vehicle and select space vector points within the predicted flightable area based on information (e.g., weather information, size information, obstacle information, regulatory information, occupancy information by the unmanned vehicle, etc.) included in each space vector point in the 3-dimensional airspace and the size of the unmanned vehicle. In this case, the path manager 120 may visualize and display information on the selected space vector points by sizes of the space vector points. That is, the size of the space vector points located in the flightable area may vary depending on the wind speed, the wind direction, the size and speed of the unmanned vehicle, and the like.

A flight path of the unmanned vehicle may be displayed as the corridor, for example, the flight path of the unmanned vehicle may be constituted by one or more individual corridors or multiple individual corridors each connected between a plurality of space vector points. That is, the corridors representing the flight path of the unmanned vehicle may be constituted by one or multiple individual corridors, wherein an individual corridor refers to a unit corridor connected between a pair of adjacent space vector points.

The corridor generator 130 may calculate one or multiple flight paths by using the point cloud in the predicted flightable area, and generate the corridors based on the calculated flight paths. For example, the corridor generator 130 may calculate a 3-dimensional flight path based on information (e.g., weather information, size information, obstacle information, regulatory information, occupancy information by the unmanned vehicle, etc.) on the space vector points within the flightable area and the spacings of the space vector points, and may display information related to the 3-dimensional flight path.

In addition, the corridor generator 130 may constitute a plurality of corridors based on a preset corridor constitution type and a preset obstacle avoidance type.

As for the corridor constitution type, either a user-selectable type or an automated type may be selected. In the user-selectable type, when the user selects space vector points along a desired direction through an input means (e.g., a virtual keyboard, etc.), a flight path is generated according to the selected space vector points, and the flight path to an arrival point is generated through a linear interpolation of space coordinates in response to an traveling direction of between the space vector points. The automated type receives a starting point and an arrival point, and generates a path based on the space vector points having a shortest distance among all the paths that may be generated from the starting point to the arrival point. In this case, the starting point and the arrival point may be selected from among the space vector points of the point cloud. As the obstacle avoidance type, either a corridor type or a curve type may be selected. When an obstacle is detected on a flight path in the 3-dimensional airspace, the corridor type generates a path by allowing it to deflect to other space vector point. When an obstacle is detected on a flight path in the 3-dimensional airspace, the curve type generates a path by allowing it to deflect to an interpolation point by a Bezier curve.

In this case, the space vector points and information constituting each corridor may be stored and managed independently to each other.

Additionally, the corridor may be constituted by reflecting information on the space vector points according to time, for example, the occupancy time and the occupancy duration by the unmanned vehicle, and identification information of the unmanned vehicle occupying the space vector point.

Further, in each corridor, predetermined information, for example, identification information of the flight path, a corridor constitution type (a user-selectable type, an automated type), and an obstacle avoidance type (a corridor type, a curve type) for the building and the terrain on the flight path, a distance from the starting point, arrival time, and the like may be displayed. In this regard, in the respective corridors, displayed states of the space vector points, for example, colors, transparencies, etc. may be displayed differently according to a time sequence, and information on the unmanned vehicle occupying the space vector points according to the time sequence (e.g., for example, identification information, etc.) may be displayed, but the information on the corresponding unmanned vehicle may be displayed in the order of occupying the corresponding space vector points.

Meanwhile, the individual corridor may be displayed by a stereoscopic structure including an internal space in which the unmanned vehicle can fly, and the form of the individual corridor may be determined based on size information of a pair of adjacent space vector points.

For example, the form of the individual corridor may be determined as one of a first form in which a cross-sectional area is increased, a second form in which a cross-sectional area is kept constant, and a third form in which a cross-sectional area is decreased. In addition, the cross-sectional area of the individual corridor may be defined as an area of the cross-section perpendicular to the flight path direction or an area of the cross-section perpendicular to the straight line connecting center points of a pair of adjacent space vector points.

The individual corridor may include a first end and a second end, each of which is connected to the pair of adjacent space vector points, and an outer peripheral surface connected between the first end and the second end.

In this case, the size of the first end of the individual corridor may be determined corresponding to the size information of a space vector point to which the first end is connected, and the size of the second end of the individual corridor may be determined correspond to the size information of a space vector point to which the second end is connected. In addition, the outer circumferential surface of the individual corridor may be constituted of a set of straight lines connected between the first end and the second end.

For example, when the space vector points are represented by the sphere having a diameter corresponding to the size information, the outer circumferential surface of the individual corridor may be constituted of a set of tangent lines connected between the pair of adjacent space vector points.

In addition, the first end and the second end of the individual corridor may be defined through closed curves or planes, and may be disposed to be perpendicular to the flight path or perpendicular to a straight line connecting a center point of the pair of adjacent space vector points. The path verifier 140 may verify the flight path for each corridor and perform the simulation of the flight path. For example, the path verifier 140 may verify the flight path and perform the simulation thereof according to the speed and time of the unmanned vehicle, wherein the outputs of all corridors verified by the path verifier 140 may be displayed on the 3-dimensional airspace. In this case, the outputs of all corridors may be matched with identification information (e.g., a path ID) of the flight path and may be stored in the database of the path storage 140.

Figure 2:
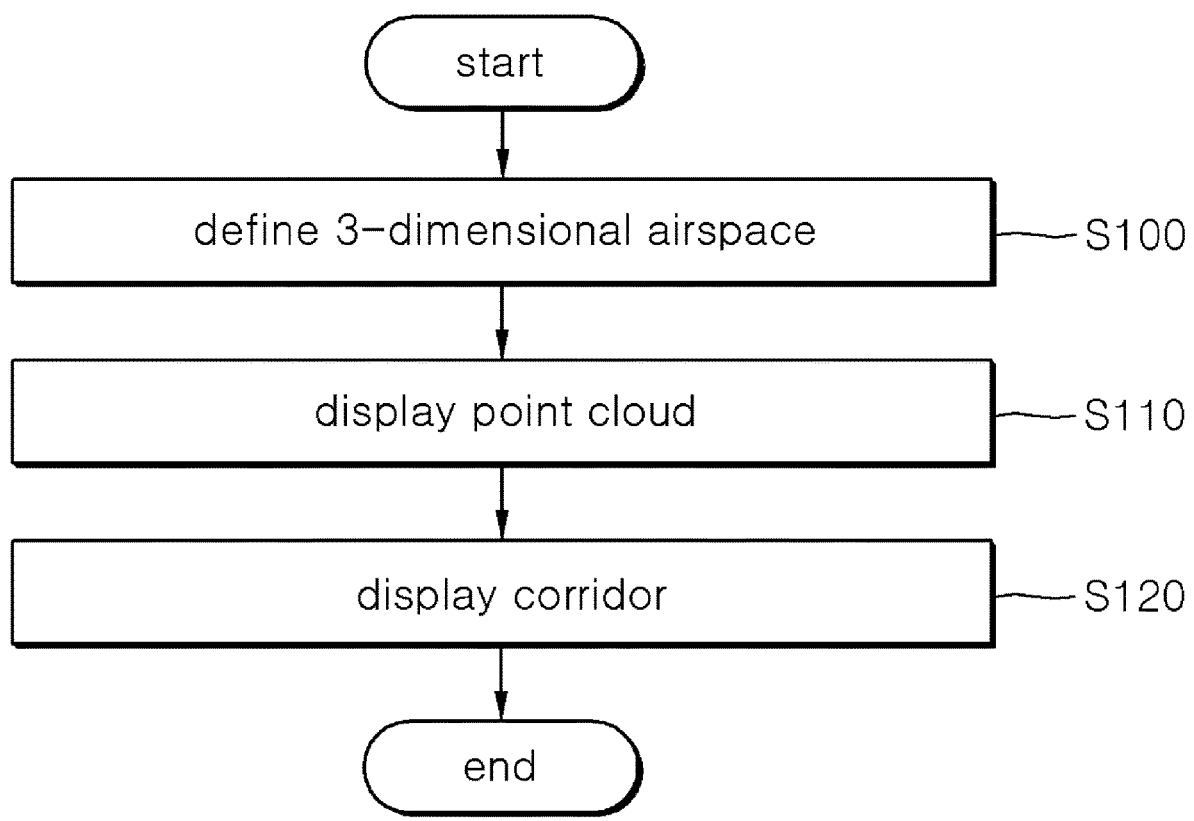
FIG. 2 is a diagram illustrating a method of displaying a corridor for an unmanned vehicle according to an embodiment of the present invention.
Figure 3:
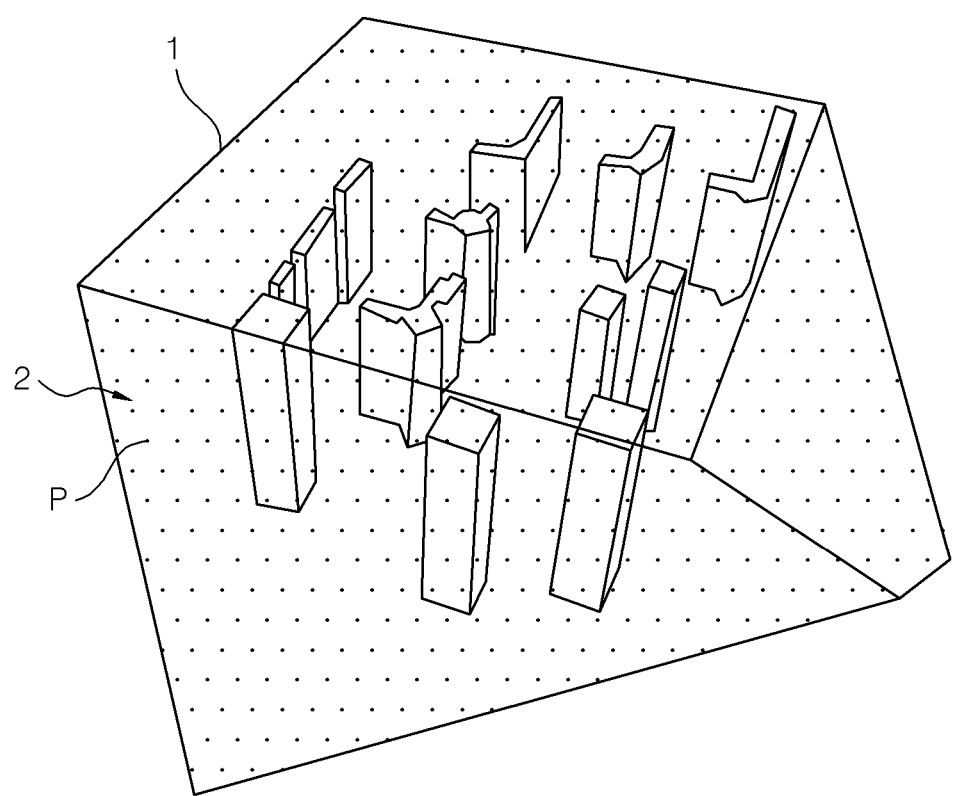
FIG. 3 is a view illustrating a 3-dimensional airspace and space vector points according to an embodiment of the present invention.
Figure 4:
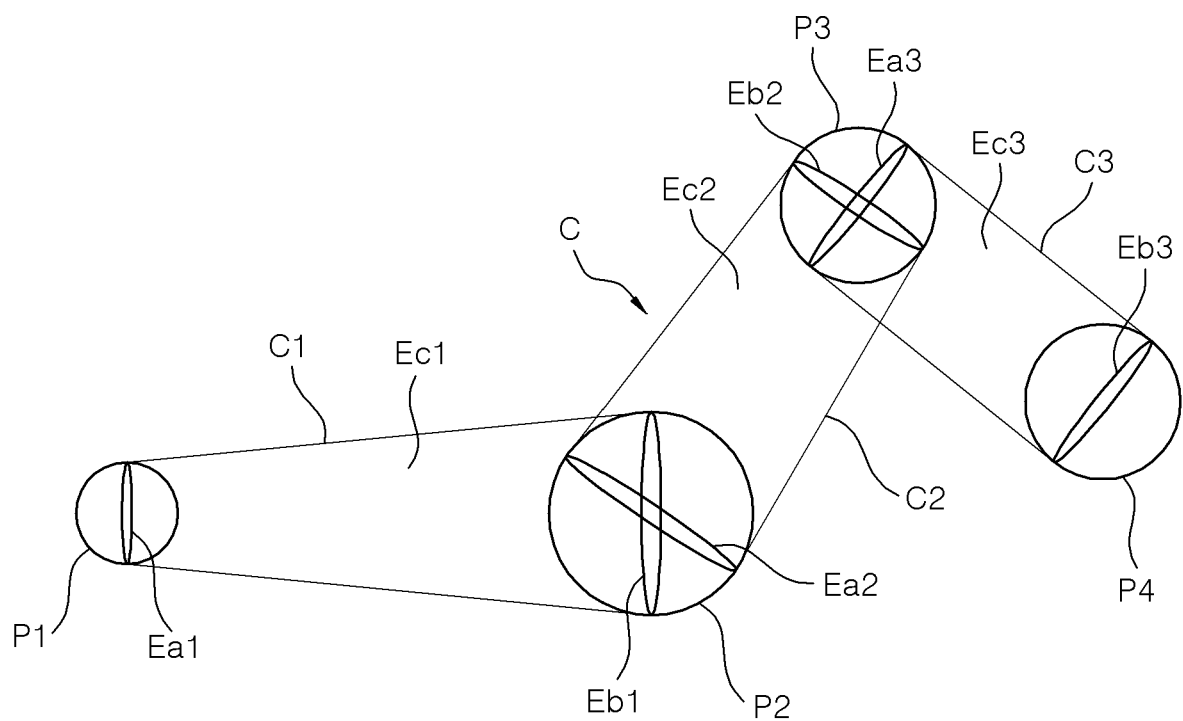
FIG. 4 is a view illustrating corridors according to an embodiment of the present invention.
Figure 5:
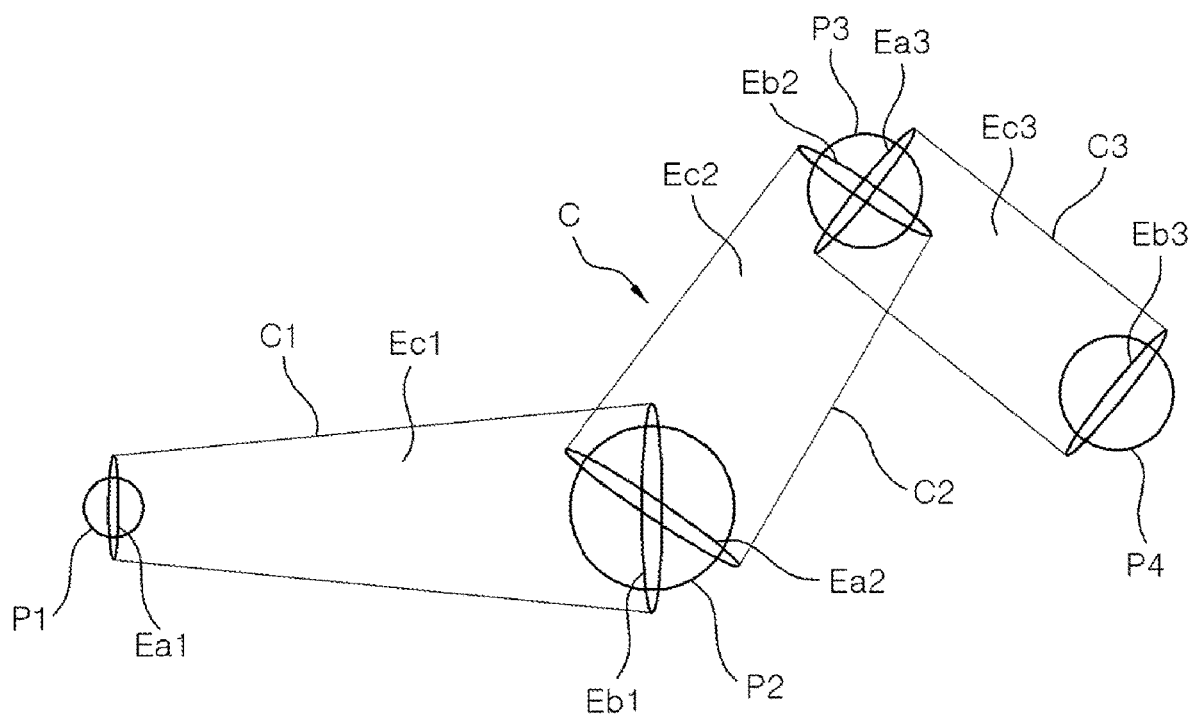
FIG. 5 is a view illustrating corridors according to another embodiment of the present invention.

FIG. 2 is a diagram illustrating a method of displaying a corridor for an unmanned vehicle according to an embodiment of the present invention, FIG. 3 is a view illustrating a 3-dimensional airspace and space vector points according to an embodiment of the present invention, FIG. 4 is a view illustrating a corridor according to an embodiment of the present invention, and FIG. 5 is a view showing a corridor according to another embodiment of the present invention. In particular, in FIGS. 4 and 5, some space vector points and individual corridors are enlarged and illustrated for convenience of explanation.

Referring to FIG. 2, a method of displaying a corridor for an unmanned vehicle according to an embodiment of the present invention may include steps of: defining a 3-dimensional airspace (S100), displaying a point cloud (S110), and displaying corridors (S120).

In the step of defining a 3-dimensional airspace (S100), location data capable of determining the range of a 3-dimensional airspace 1 may be collected to define the 3-dimensional airspace 1. For example, location data required for the definition of the 3-dimensional airspace 1 may be directly inputted from a user or may be input from a separate geographic information system (GIS).

In the step of displaying a point cloud (S110), after setting for the 3-dimensional airspace 1 is completed, a point cloud 2 may be generated and disposed in the corresponding 3-dimensional airspace 1. As described above, the point cloud 2 may be composed of a plurality of space vector points P.

When a flight path of the unmanned vehicle is displayed based on the space vector points P in the 3-dimensional airspace 1, a complexity is reduced compared to a conventional cube or grid form, and thus a visibility and recognition to the surrounding environment are improved, thereby facilitating constitution and display of the corridor.

Referring to FIG. 4, in the step of displaying a corridor (S120), a corridor C indicating the flight path of the unmanned vehicle may be displayed. Specifically, individual corridors C1, C2, and C3 connecting between selected space vector points P1, P2, P3, and P4 from among the space vector points P constituting the point cloud 2 may be generated and be displayed.

In this case, the individual corridors C1, C2, and C3 may be displayed by a stereoscopic structure having an internal space in which the unmanned vehicle can move, and the forms of the individual corridors C1, C2, and C3 may be determined based on size information of a pair of adjacent space vector points P1, P2, P3, P4.

For example, the form of the first individual corridor C1 may be determined based on size information of a pair of adjacent space vector points P1 and P2, the form of the second individual corridor C2 may be determined based on size information of a pair of adjacent space vector points P2 and P3, and the form of the third individual corridor C3 may be determined based on size information of a pair of adjacent space vector points P3 and P4.

The forms of these individual corridors C1, C2, and C3 may be determined as one of a first form in which a cross-sectional area is increased (see a first individual corridor C1), a second form in which a cross-sectional area is constant (see a third individual corridor C3), and a third form in which a cross-sectional area is decreased (see a second individual corridor C2).

The individual corridors C1, C2, and C3 may include first ends Ea1, Ea2, Ea3 and second ends Eb1, Eb2, Eb3, which are connected to a pair of their adjacent space vector points P1, P2, P3, P4, and outer peripheral surfaces Ec1, Ec2, Ec3, which are connected between the first ends Ea1, Ea2, Ea3 and the second ends Eb1, Eb2, Eb3.

For example, the first end Ea1 of the first individual corridor C1 is connected to the first space vector point P1, and the magnitude of the first end Ea1 may be determined corresponding to the size information of the first space vector point P1. The second end Eb1 of the first individual corridor C1 is connected to the second space vector point P2, and the size of the second end Eb1 may be determined corresponding to the size information of the second space vector point P2. In addition, the outer peripheral surface of the first individual corridor C1 may be constituted as a set of straight lines connecting between the first end Ea1 and the second end Eb1.

As an example, when the first space vector point P1 and the second space vector point P2 are displayed as spheres having diameters corresponding to their size information, respectively, and when the size information of the first space vector point P1 and the second space vector point P2 are different, the first individual corridor C1 may be displayed in the form of a circular truncated cone. In addition, the outer peripheral surface of the first individual corridor C1 may be constituted as a set of tangent lines connecting between the first space vector point P1 and the second space vector point P2.

The first end Ea2 of the second individual corridor C2 may be connected to the second space vector point P2, and the size of the first end E2a may be determined corresponding to the size information of the second space vector point P2. The second end Eb2 of the second individual corridor C2 may be connected to the third space vector point P3, and the size of the second end Eb2 may be determined corresponding to the size information of the third space vector point P3. In addition, the outer peripheral surface of the second individual corridor C2 may be constituted as a set of straight lines connecting between the first end Ea2 and the second end Eb2. For example, when the second space vector point P2 and the third space vector point P3 may be displayed as spheres having diameters corresponding to their size information, respectively, and when the size information of the second space vector point P2 and the third space vector point P3 are different, the second individual corridor C2 may be displayed in the form of a circular truncated cone. In addition, the outer peripheral surface of the second individual corridor C2 may be constituted as a set of tangent lines connecting between the second space vector point P2 and the third space vector point P3.

The first end Ea3 of the third individual corridor C3 is connected to the third space vector point P3, and the size of the first end Ea3 may be determined according to the size information of the third space vector point P3. The second end Eb3 of the third individual corridor C3 is connected to the fourth space vector point P4, and the size of the second end Eb3 may be determined corresponding to the size information of the fourth space vector point P4. In addition, the outer peripheral surface of the third individual corridor C3 may be constituted as a set of straight lines connecting between the first end Ea3 and the second end Eb3.

For example, when the third space vector point P3 and the fourth space vector point P4 may be displayed as spheres having diameters corresponding to their size information, respectively, and when the size information of the third space vector point P3 and the fourth space vector point P4 are the same, the third individual corridor C3 may be displayed in the form of a circular cylinder. In addition, the outer peripheral surface of the third individual corridor C3 may be constituted as a set of the tangent lines connecting between the third space vector point P3 and the fourth space vector point P4.

As described above, each individual corridor C1, C2, and C3 has the form corresponding to the size information of the pairs of adjacent space vector points P1, P2, P3, and P4, and thus such surrounding information may be reflected to each individual corridor C1, C2, and C3, thereby resulting in a more precise form of visualization and display.

Although FIG. 4 illustrates a case in which each of the space vector points P1, P2, P3, and P4 is displayed as the stereoscopic form having the size that matches their size information, if necessary for improving visibility, the sizes of the space vector points P1, P2, P3, and P4 may be adjusted as shown in FIG. 5. For example, the size of each of the space vector points P1, P2, P3, and P4 may be displayed to be enlarged or reduced by applying a certain ratio to the size information of each of the space vector points P1, P2, P3, and P4. In addition, some of the space vector points may not be displayed as deactivation if necessary.

Figure 6A:
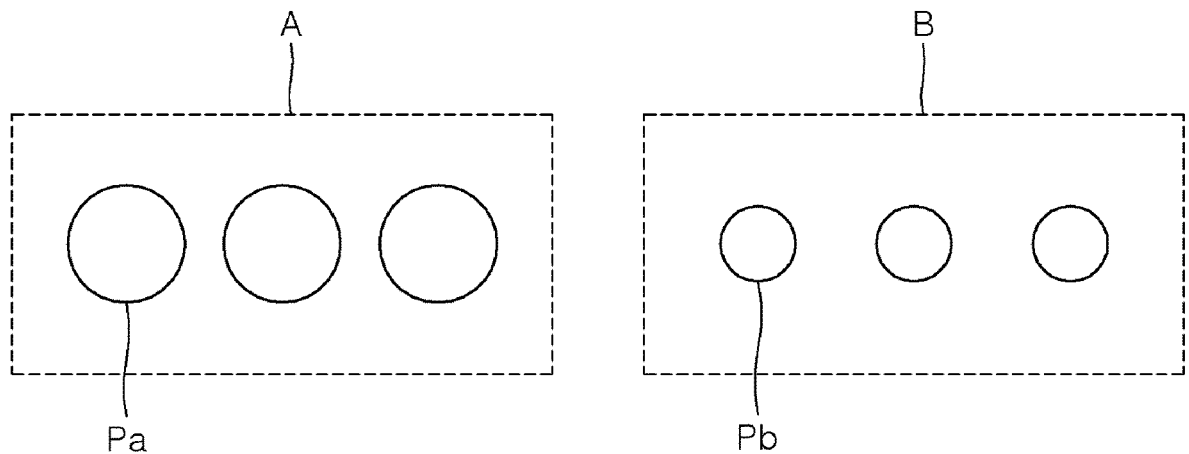
FIGS. 6A to 6C are views illustrating forms of space vector points according to an embodiment of the present invention.
Figure 6B:
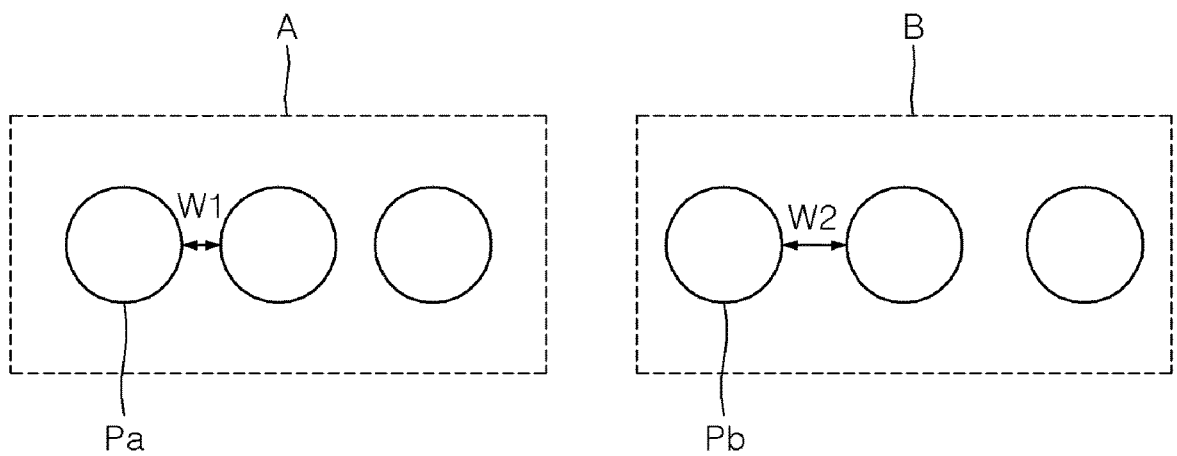
Figure 6C:
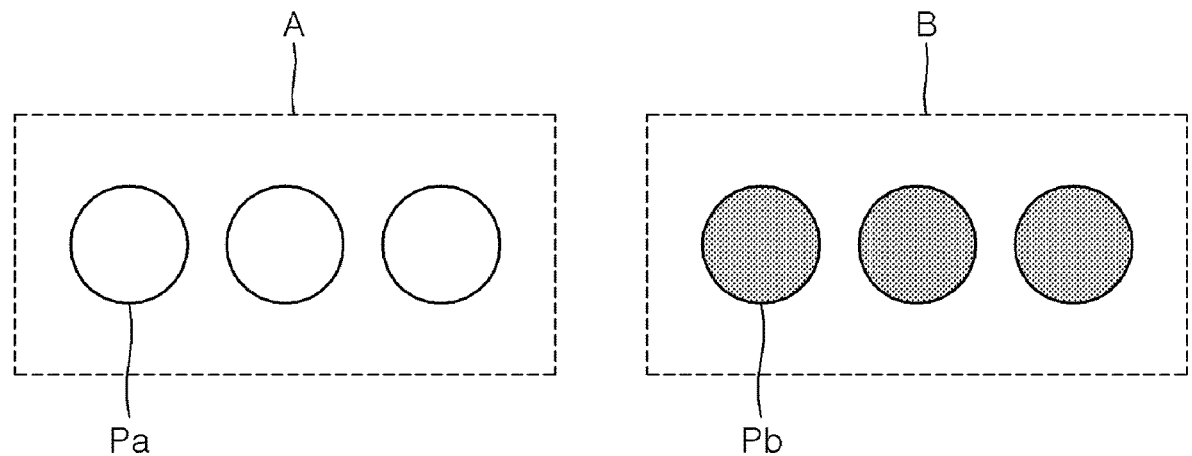
Figure 6D:
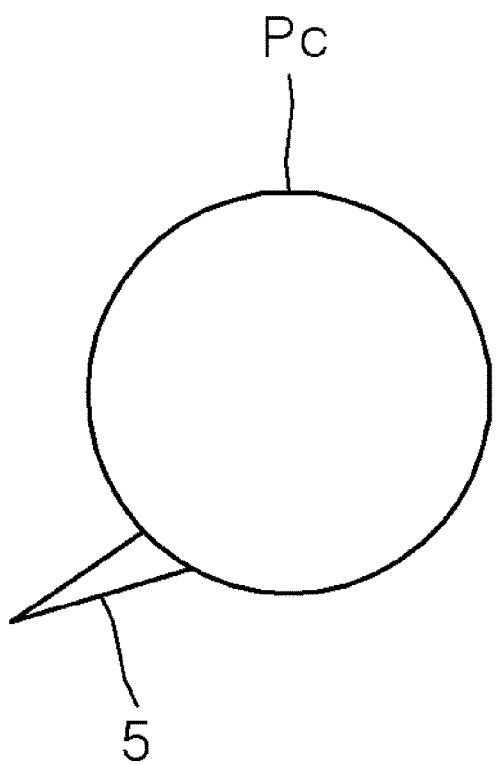
FIG. 6D is a diagram illustrating space vector points in which visualization elements are displayed according to an embodiment of the present invention.

FIGS. 6A to 6C are views illustrating the forms of space vector points according to the embodiment of the present invention, and FIG. 6D is a diagram illustrating space vector points in which visualization elements are displayed according to an embodiment of the present invention. The method of displaying a corridor for an unmanned vehicle according to an embodiment of the present invention may further include a step of changing at least one of size, spacing, and color of space vector points P located in at least a partial area of the 3-dimensional airspace 1.

For example, referring to FIG. 6A, a size of space vector points Pb located in a second area B may be changed. Accordingly, the size of the space vector points Pb located in the second area B may be set to be different from the size of space vector points Pa located in a first area A. Also, referring to FIG. 6B, a spacing W2 between space vector points Pb located in a second area B may be changed. Accordingly, the interval W2 between the space vector points Pb located in the second area B may be set to be different from a spacing W1 between the space vector points Pa located in a first area A.

Referring to FIG. 6C, a color of space vector points Pb located in a second area B may be changed. Accordingly, the color of the space vector points Pb located in the second area B may be set to be different from a color of space vector points Pa located in a first area A.

At least one of the size, spacing, and color of the space vector points P may be changed based on information on the space vector points P, and thus the characteristics of the space vector points P may be changed and displayed, whereby the state of the 3-dimensional airspace 1 may be visualized in a more intuitive form and provided to the user.

Meanwhile, referring to FIG. 6D, a visualization element 5 representing weather information may be displayed on a space vector point Pc according to an embodiment of the present invention. For example, the visualization element 5 may be displayed in a stereoscopic shape in which its length and direction may be changed, and the length and direction may be changed according to wind speed and direction, which are sensitive weather information.

Figure 7:
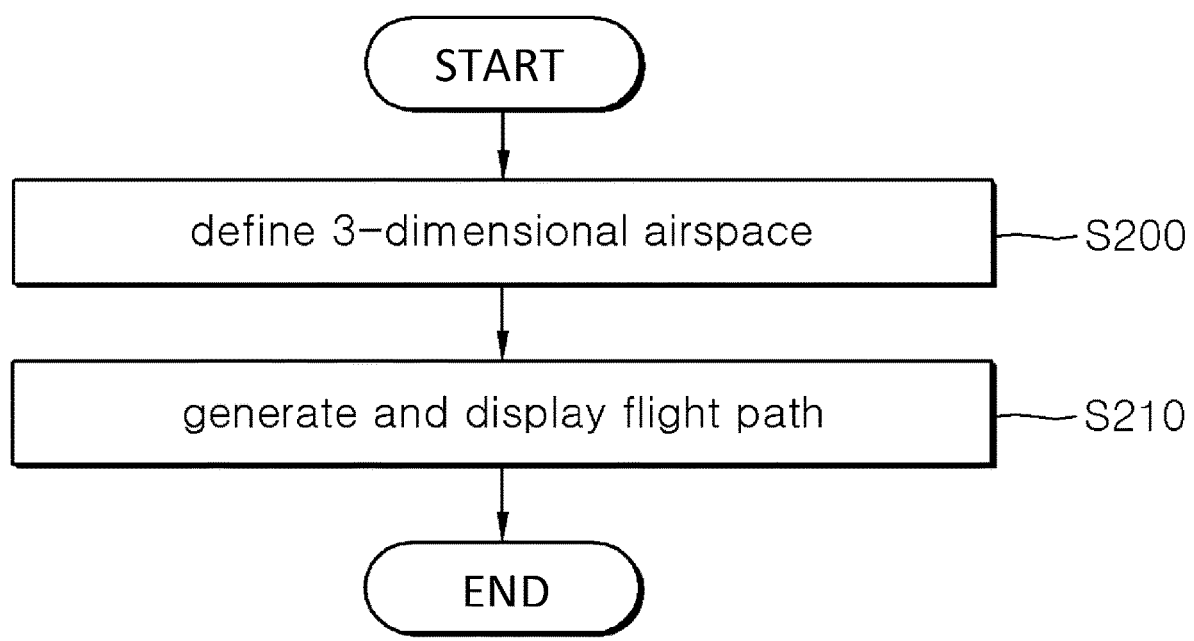
FIG. 7 is a diagram illustrating a method of displaying a path for an unmanned vehicle according to an embodiment of the present invention.

FIG. 7 is a diagram illustrating a method of displaying a path for unmanned vehicle according to an embodiment of the present invention.

Referring to FIG. 7, the method of displaying a path for an unmanned vehicle according to an embodiment of the present invention may include steps of: defining a 3-dimensional airspace (S200) and generating and displaying a flight path (S210).

In the step of defining a 3-dimensional airspace (S200), a point cloud-based 3-dimensional airspace for generating a flight path of an unmanned vehicle may be defined.

In the step of generating and displaying a flight path (S210), the flight path of the unmanned vehicle may be generated and displayed using a point cloud in the 3-dimensional airspace.

The point cloud 2 may be composed of a plurality of space vector points including information affecting the movement of the unmanned vehicle. For example, the information affecting the movement of the unmanned vehicle may include weather information, size information, obstacle information, regulatory information, occupancy information by the unmanned vehicle, and the like.

In addition, the flight path of the unmanned vehicle may be generated based on selected space vector points selected from among the space vector points and individual corridors connecting the selected space vector points. In this case, the form of the individual corridors may be determined based on size information of a pair of adjacent space vector points. Since the method of determining the form of the individual corridors has been described in detail above, the description thereof will be omitted here.

Figure 8:
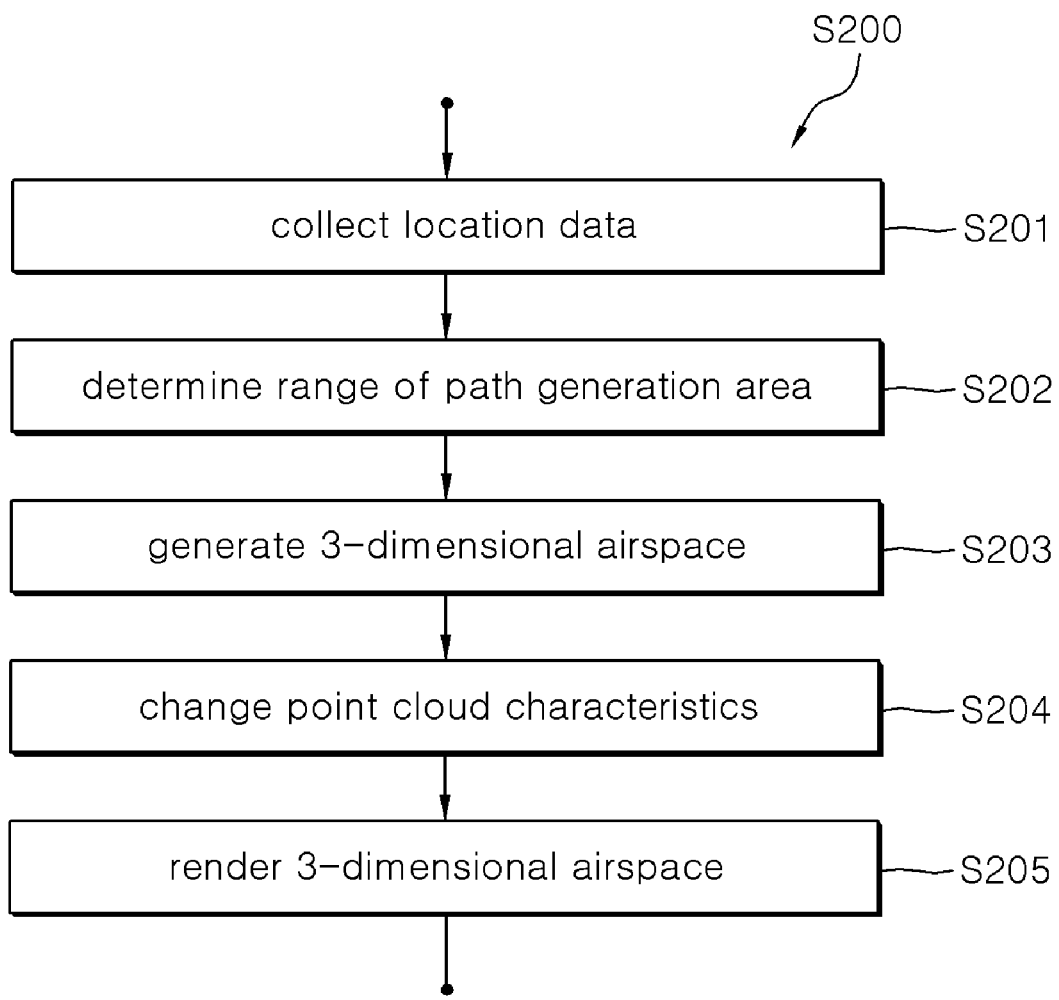
FIG. 8 is a diagram illustrating a step of defining a 3-dimensional airspace according to an embodiment of the present invention.
Figure 9:
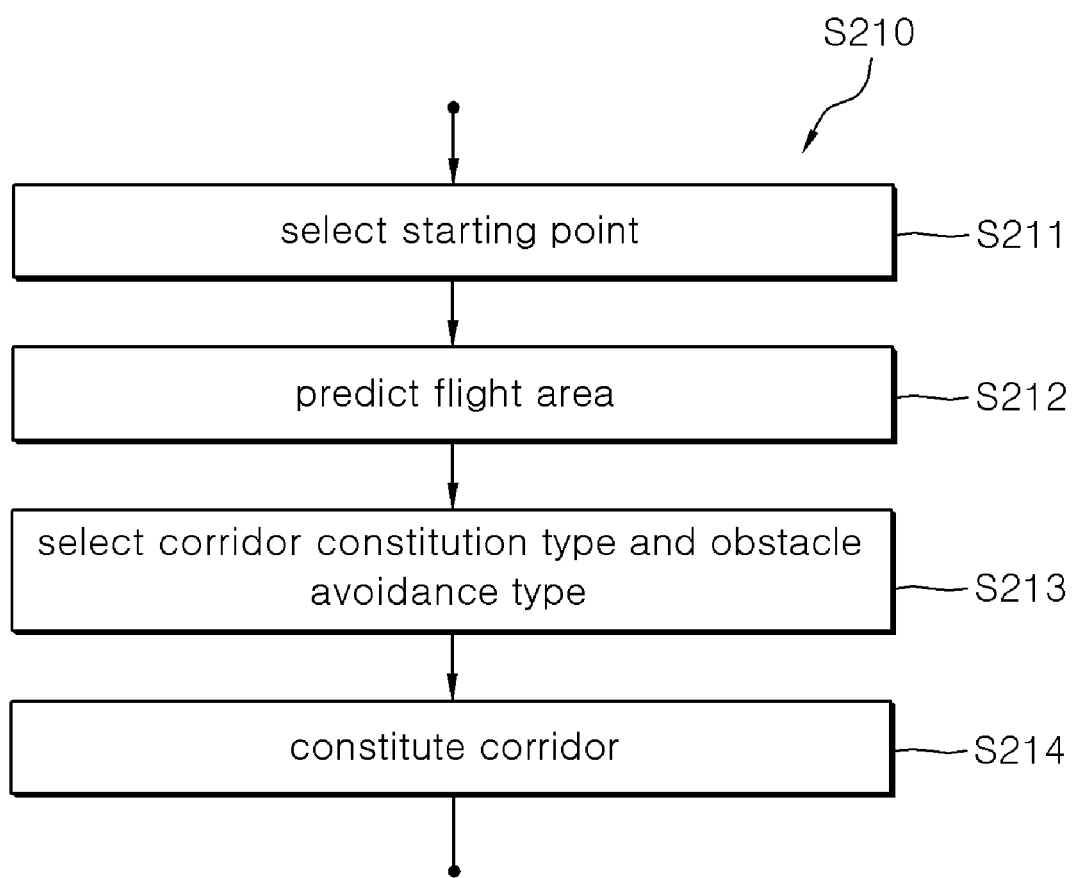
FIG. 9 is a diagram showing a step of generating and displaying a flight path according to an embodiment of the present invention.

FIG. 8 is a diagram illustrating a step of defining a 3-dimensional airspace according to an embodiment of the present invention, and FIG. 9 is a diagram illustrating a step of generating and displaying a flight path according to an embodiment of the present invention.

Referring to FIG. 8, the step of defining a 3-dimensional airspace (S200) according to an embodiment of the present invention may include steps of: collecting location data (S201), determining a range of a path generation area (S202), generating the 3-dimensional airspace (S203), changing a point cloud characteristic (S204), and rendering the 3-dimensional airspace (S205).

In the step of collecting location data (S201), the location data for a path generation area for generating the flight path of the unmanned vehicle may be collected. In this step (S201), location data for at least one area may be collected, and the location data for the area for generating the flight path may be directly inputted from a user or may be inputted from a separate geographic information system (GIS). In addition, the location data for the path generation area may be defined as data that may specify a location and range of a zone, and for example, may be provided in the form of the coordinate system and administrative district (e.g., city, province, district, county, etc.).

In the step of determining a range of a path generation area (S202), the range of the path generation area may be determined based on the collected location data. For example, in this step (S202), the range of the path generation area may be determined to cover all the regions inputted in the previous step (S201).

In the step of generating a 3D airspace (S203), the 3-dimensional airspace on which a point cloud 2 is disposed may be generated based on the determined range of the path generation area.

In the step of changing a point cloud characteristic (S204), the characteristic of the point cloud may be changed according to the surrounding environment of the 3-dimensional airspace or a user request. For example, at least one of the size, spacing, position, and color of the space vector points constituting the point cloud may be changed. For example, the size, spacing, location, color, etc. of the space vector points may be controlled by adjusting parameter values for controlling the corresponding components, and the corresponding parameter values may be manually controlled by the user or may be automatically controlled according to the surrounding environment, such as obstacles in the 3-dimensional airspace.

In the step of rendering the 3D airspace (S205), the 3D airspace may be rendered based on the characteristic of the point cloud determined in the previous step.

The plurality of space vector points may be disposed within the 3-dimensional airspace, and the spacing between the space vector points may be formed as an initial set value or may be determined by a preset algorithm. For example, the spacing between the space vector points may be changed by reflecting the surrounding environment such as the terrain feature located in the 3-dimensional airspace. In addition, the spacing of the space vector points may be adjusted in response to the user input.

When no-fly zones exist within the 3-dimensional airspace, colors of the airspace for the no-fly zone and the permitted zone may be displayed differently.

Referring to FIG. 9, the step of generating and displaying a flight path (S210) according to an embodiment of the present invention may include steps of: selecting a starting point (S211), predicting a flightable area (S212), selecting a corridor constitution type and an obstacle avoidance type (S213), and constituting corridors (S214).

In the step of selecting a starting point (S211), the starting point may be selected from among the space vector points in the 3-dimensional airspace.

In the predicting a flightable area (S212), the flightable area may be predicted based on information on the selected starting point and information on the size of the unmanned vehicle. In addition, in this step (S212), it may be possible to predict the space vector points through which the unmanned vehicle within the flightable area will pass based on the information on the space vector points (e.g., weather information, size information, obstacle information, regulatory information, occupancy information by the unmanned vehicle, etc.) and the size information on the unmanned vehicle, etc.

In this case, the size of the space vector points through which the unmanned vehicle will pass may be determined based on the wind speed, the wind direction, the size and speed of the unmanned vehicle, and the like. Accordingly, in this step (S212), when the sizes of the respective space vector point are determined, the determined sizes may be reflected to the corresponding space vector point in the 3-dimensional airspace.

In addition, the space vector points may display predetermined information in the 3-dimensional airspace. The space vector points basically have latitude, longitude, and altitude according to the coordinate system (e.g., EPSG: 4326 (WGS84), etc.), and each space vector point may display information affecting the unmanned vehicle, such as coordinate information based on the 3-dimensional airspace 1, identification information for search and visualization, mission type, mission command, and behavioral pattern. For example, the mission type may refer to the identification information of the flight path given by a type of mission of the unmanned vehicle, the mission command may refer to importance of the flight path according to the mission of the unmanned vehicle, and the behavior pattern may refer to whether or not there are regulations related to the operation of the unmanned vehicle (e.g., shooting, flying, etc.).

Meanwhile, the space vector points may further include a temporal vector. The space vector points may display information that affects the movement of the unmanned vehicle, such as occupancy time and occupancy duration of the flight path by the unmanned vehicle, and identification information of the unmanned vehicle occupying the space vector points.

In the step of selecting a corridor construction type and an obstacle avoidance type (S213), either a user selection type or an automated type may be selected.

For example, the user selection type may generate a path (a drone path) according to a point cloud selected by clicking on a desired direction to an arrival point via input means (e.g., virtual keyboards, etc.), and perform linear interpolation on spatial coordinates located in the traveling direction between each space vector points, and render the generated path. In the user selection type, if there is an obstacle, building, terrain, or the like in the traveling direction during the constitution of the corridors, it can be notified to the user and the path constitution in that direction may be blocked.

In addition, the automated type may receive the starting point and the arrival point, and generate the path based on a space vector point having the shortest distance among all possible paths from the starting point to the arrival point. In the automated type, if there is an obstacle, building, terrain, or the like in front of the traveling path during the constitution of corridors, an avoidance path may be calculated according to a selected obstacle avoidance type, and a finally calculated path may be rendered.

The obstacle may be detected based on location information of the terrain feature in the 3-dimensional airspace. In this case, when constituting a path by including space vector point disposed at a position close to the position of the terrain feature, the obstacle may be detected based on the traveling direction of the path from the corresponding space vector point and the position of the terrain feature.

As another method of detecting an obstacle, the obstacle may be detected based on path information occupied in advance by another unmanned vehicle. In this case, a space vector point may be detected as the obstacle when constituting a path by including the corresponding space vector point disposed at a position corresponding to the path pre-occupied by the another unmanned vehicle.

In this regard, in this step (S213), the obstacle avoidance type may be selected as any one of a corridor type and a curve type.

The corridor type allows a path to deflect to other space vector point around the path upon detection of the obstacle in the traveling direction of the path.

The curve type allows a path to deflect to an interpolation point by a Bezier curve when detecting the obstacle in the direction of travel of the path.

In the step of constituting corridors (S214), a plurality of corridors may be constituted based on information on the space vector points located within the flightable area.

When the constitution of the plurality of corridors is completed through this step (S214), the space vector points included in the plurality of corridors may be extracted. In this case, the extracted space vector points and their information may be managed separately in order to generate and manage the plurality of flight paths separately from the space vector points on the 3-dimensional airspace.

If the starting point is changed while constituting the corridors, the plurality of corridors may be reconstituted by re-performing the above-described processes. When the corridors are being constituted, existing corridors may be deleted or reconstituted in the middle.

Figure 10:
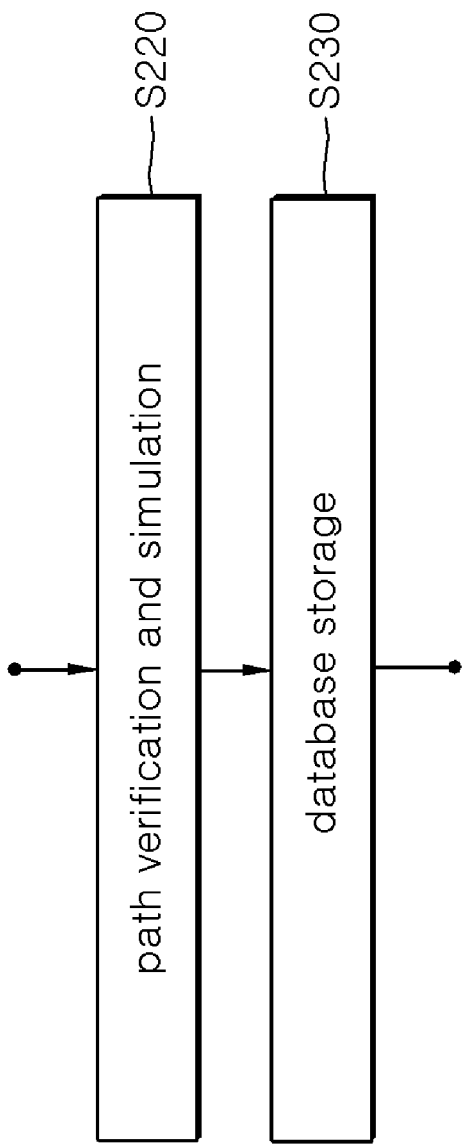
FIG. 10 is a diagram illustrating a path verification and simulation step and a database storage step according to an embodiment of the present invention.

FIG. 10 is a diagram illustrating a path verification and simulation step and a database storage step according to an embodiment of the present invention.

The method of displaying a path for an unmanned vehicle according to an embodiment of the present invention may additionally include a path verification and simulation step (S220) and a database storage step (S230).

In the path verification and simulation step (S220), the paths corresponding to the plurality of corridors constituted in the previous step may be verified and the flight path according to the speed and time of the unmanned vehicle may be simulated. For example, in this step (S220), a virtual path image and a virtual unmanned vehicle image for each path of the plurality of corridors may be displayed, and the position of the virtual unmanned vehicle image may be displayed while it is varied based on a flight plan according to the speed and time of the unmanned vehicle set for each path.

In addition, when the verification of the flight path is failed in this step (S220), the corridors may be reconstituted. If some of multiple flight paths fail the verification, the corridors may be reconstituted for some flight paths that fail the verification.

In the database storage step (S230), when the verification and simulation of all paths are completed, the entire corridors may be outputted, and output information on the entire corridors may be stored in the database.

Figure 11:
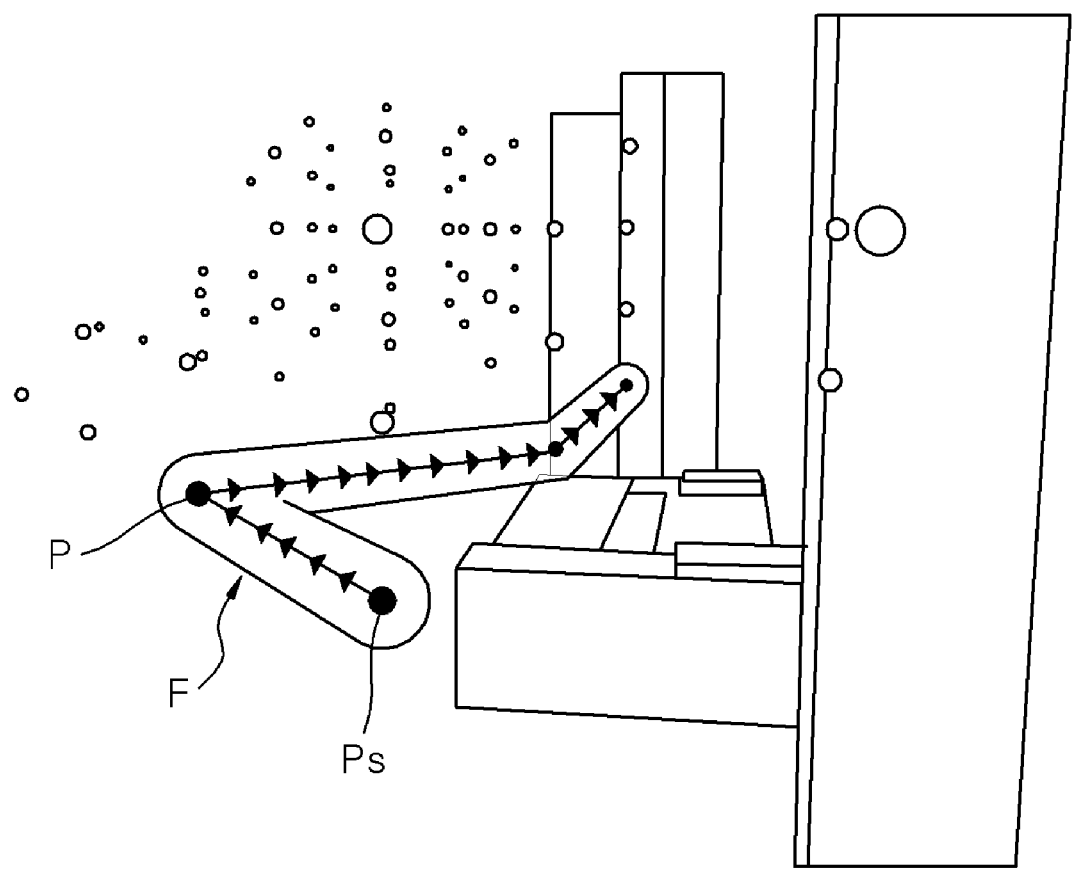
FIG. 11 is a view illustrating a corridor generation method according to an embodiment of the present invention.

FIG. 11 is a view illustrating a corridor generation method according to an embodiment of the present invention.

Referring to FIG. 11, when any one of space vector points P in a 3-dimensional airspace is selected as a starting point Ps, a corridor may be constituted by calculating a flight path F based on the selected starting point Ps. In this case, the corridor may be constituted of individual corridors connecting between space vector points located in the flight path F, wherein the size and form of the individual corridors may be determined based on information on the size of a pair of adjacent space vector points.

Figure 12:
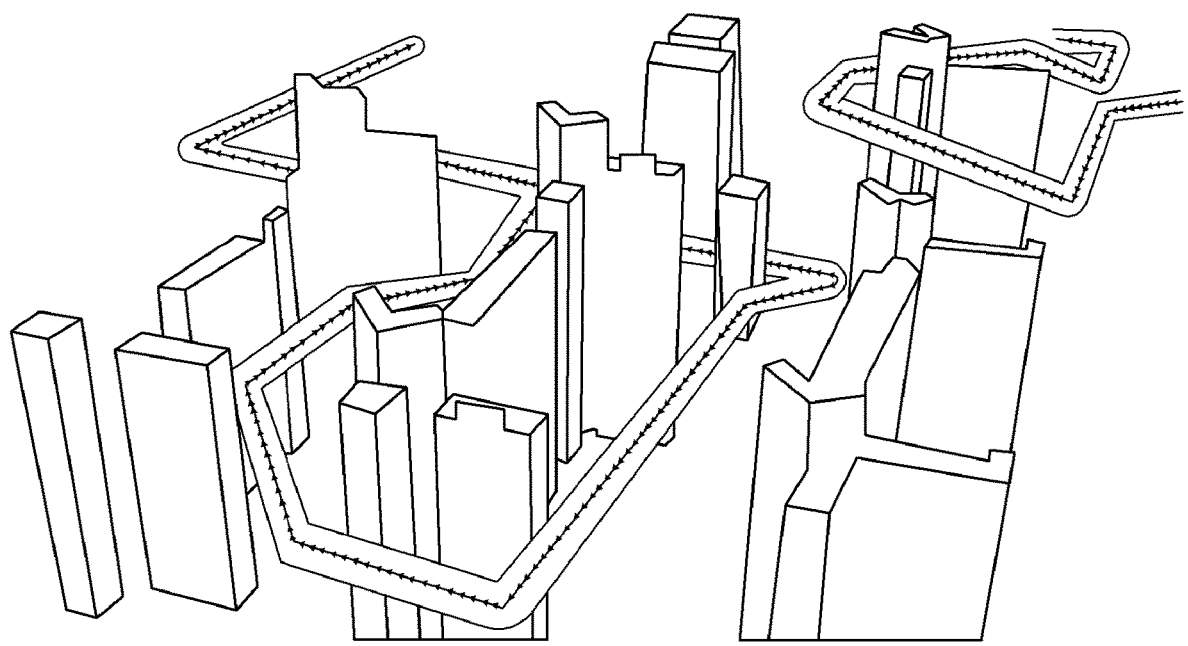
FIG. 12 is a view illustrating a state in which a plurality of corridors are displayed in a 3-dimensional airspace according to an embodiment of the present invention.

FIG. 12 is a view illustrating a state in which a plurality of corridors are displayed in a 3-dimensional airspace according to an embodiment of the present invention.

As shown in FIG. 12, a plurality of corridors may be constituted to be displayed in the 3-dimensional space. The plurality of corridors may be displayed in various forms, and for example, the space vector points included in each corridor may be displayed differently in color or transparency according to a time sequence by which the unmanned vehicle occupies the space vector points.

Figure 13:
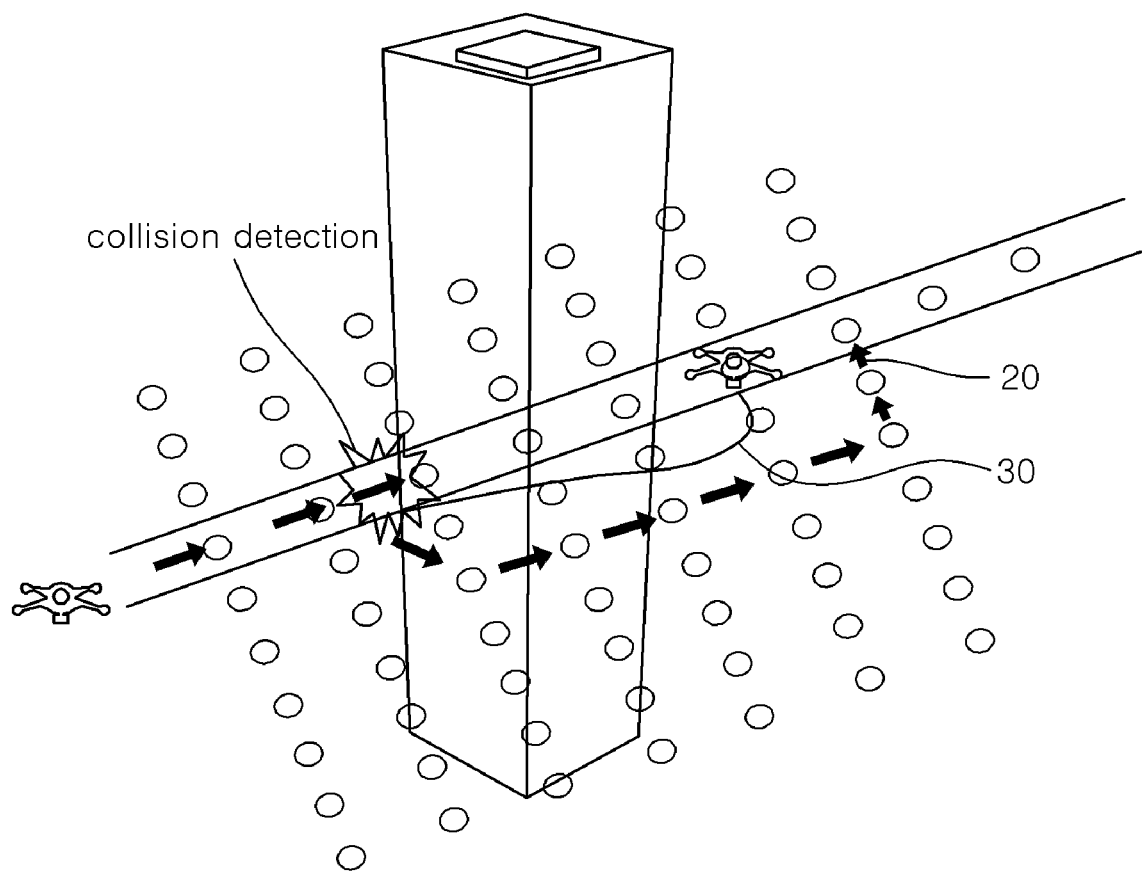
FIG. 13 is a view illustrating a collision detection and avoidance type according to an embodiment of the present invention.

FIG. 13 is a view illustrating a collision detection and avoidance type according to an embodiment of the present invention.

Referring to FIG. 13, when constituting a flight path through the corridors, obstacles such as buildings, structures, terrain features, and paths pre-occupied by other unmanned vehicles may be detected in the traveling direction of the path.

In this way, when an obstacle is detected in the traveling direction of the flight path, the flight path may be constituted by avoiding the obstacle in order to prevent the unmanned vehicle from colliding with the obstacle during the flight of the unmanned vehicle.

As described above, as the obstacle avoidance type, either the corridor type or the curve type may be selected.

A corridor type 20 may prevent collision with the obstacle by selecting other space vector points around a path and then constituting the path to avoid the obstacle when the obstacle is detected in the traveling direction of the flight path and a collision is expected.

When constituting the path to avoid the obstacle, the curve type 30 constitutes the path by allowing it to deflect to an interpolation point corresponding to a Bezier curve in a section in which the obstacle exists, thereby preventing collision with the obstacle.

Meanwhile, the method of constituting a path through the Bezier curve may be applied not only when generating an obstacle avoidance path, but also to where a direction of the flight path is rapidly changed. For example, by applying the path constitution method through the Bezier curve to a part where the flight path is bent, it may be implemented to more smoothly facilitate the flight of the unmanned vehicle at that part.

Figure 14:
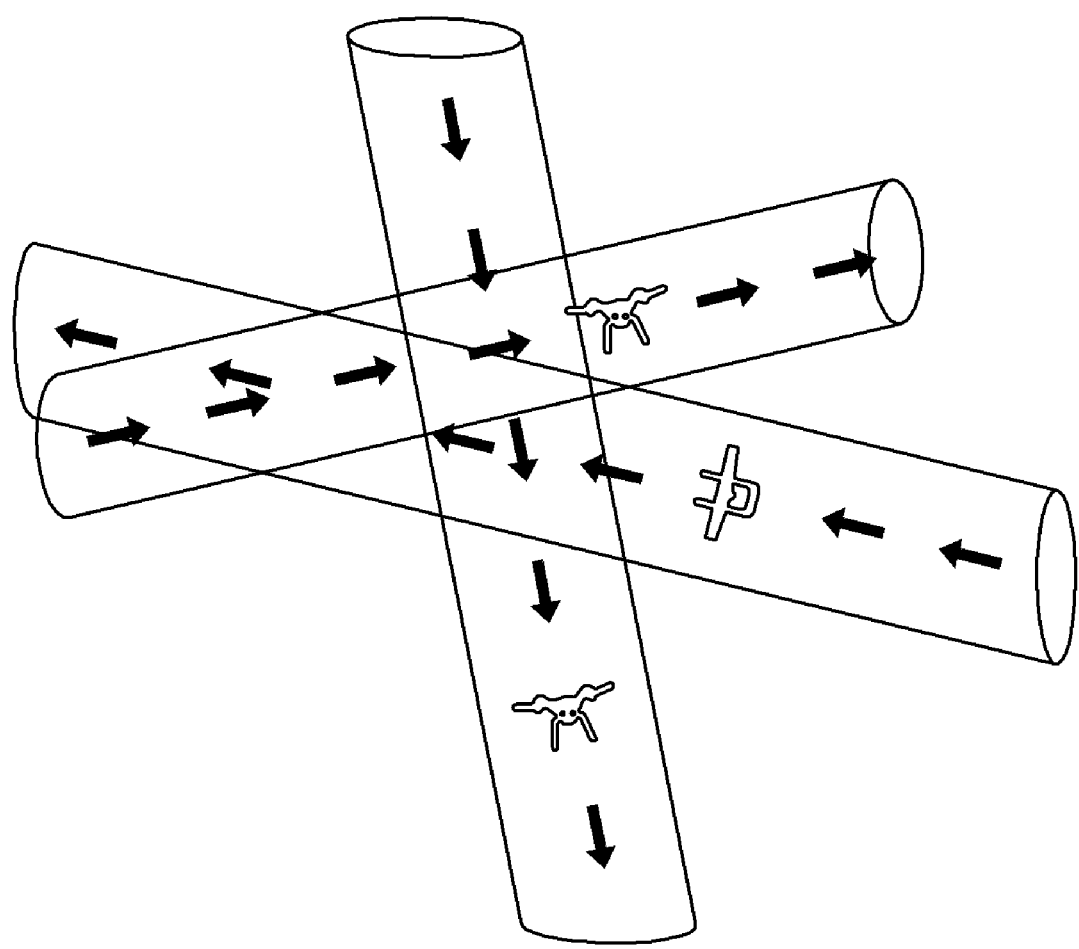
FIG. 14 is a view illustrating a path verification and simulation operation according to an embodiment of the present invention.

FIG. 14 is a view illustrating a path verification and simulation operation according to an embodiment of the present invention.

Referring to FIG. 14, a plurality of flight paths may overlap each other in some sections. Therefore, when the unmanned vehicle moves along the plurality of flight paths, an accident of collision may occur in a predetermined section. Also, when the unmanned vehicle moves along the flight path, the accident of colliding with an obstacle may occur due to the influence of the surrounding environment.

To prevent this, flight simulations may be performed virtually according to the plan set for each flight path to check in advance whether a collision between unmanned vehicles or a collision between unmanned vehicles and obstacles will occur.

For example, for the simulation operation of the flight paths, the flight status for each flight path may be checked by displaying a virtual path image and a virtual unmanned vehicle image on a plurality of flight paths, and displaying the location of the virtual unmanned vehicle image while it is being varied based on the flight plan pursuant to a preset speed and time of an unmanned vehicle.

If a collision accident occurs during the process of the path simulation, it is considered that the verification has been failed and the path of the corridor may be reconstituted.

Upon completion of path verification and simulation for a plurality of corridors is completed, output information of the entire corridors may be stored and managed in a database corresponding to identification information of the flight path.

According to the above-described embodiment of the present invention, the corridors are defined using the point cloud in the three-dimensional airspace, thereby finely and easily generating and displaying the flight paths of an unmanned vehicle.

In addition, according to an embodiment of the present invention, since the point cloud is used in generating a flight path in the 3-dimensional airspace, a multiplicity of flight paths may be generated at the same time, a safe flight path may be provided by reflecting environmental information of obstacles, buildings, and/or terrain located in the traveling direction of the flight path for interpolating the flight path, and verifying and simulating the flight path, thereby preventing collision accidents during the flight of the unmanned vehicle in advance.

Those of ordinary skill in the art to which the invention pertains will understand that the invention may be embodied in other specific forms without changing the technical spirit or essential features thereof. Therefore, the embodiments described above should not be construed as limiting but rather as illustrative in every respect. The scope of the disclosure is defined by the following claims rather than the detailed description, and all modifications derived from the meaning and scope of the claims and equivalents thereto or modified forms should be interpreted as being included in the scope of the disclosure.

What is claimed is:

1. A method of displaying a corridor for an unmanned vehicle in a display device, using a point cloud including a plurality of space vector points, the method comprising:
   automatically displaying the space vector points in a preset 3-dimensional space; and
   automatically generating and automatically displaying individual corridors, each individual corridor connecting between selected space vector points from among the space vector points,
   wherein each of the space vector points includes location information and size information,
   each individual corridor is automatically displayed by a stereoscopic structure including an internal space in which the unmanned vehicle can fly,
   a form of each individual corridor is automatically determined based on the size information of a pair of adjacent space vector points,
   each of the space vector points further includes weather information, and
   the size information of each of the space vector points is automatically calculated corresponding to the weather information and is periodically updated in response to a change in the weather information,
   the method further comprising:
   automatically changing the sizes of the space vector points located in at least a partial area of the 3-dimensional airspace;
   wherein the 3-dimensional airspace is automatically arranged and displayed for generating a flight path of the unmanned vehicle by:
   automatically collecting location data for a path generation area in which the flight path of the unmanned vehicle is to be generated; and
   automatically determining a range of the path generation area based on the collected location data.

2. The method according to claim 1, wherein the form of each individual corridor is determined as one of a first form in which a cross-sectional area is increased, a second form in which the cross-sectional area is maintained constant, and a third form in which the cross-sectional area is decreased.

3. The method according to claim 2, wherein each individual corridor includes a first end and a second end connected to the pair of adjacent space vector points, the size of the first end of each individual corridor is determined corresponding to size information of a space vector point to which the first end is connected, and the size of the second end of each individual corridor is determined corresponding to size information of a space vector point to which the second end is connected.

4. The method according to claim 1, wherein each of the space vector points is displayed by a sphere having a diameter corresponding to the size information thereof.

5. The method according to claim 4, wherein an outer peripheral surface of each individual corridor comprises a set of tangent lines connected between the pair of adjacent space vector points.

6. The method according to claim 3, wherein an outer circumferential surface of each individual corridor comprises a set of straight lines connected between the first end and the second end.

7. The method according to claim 1, wherein each of the space vector points is displayed by a stereoscopic shape having a size that matches the size information or is displayed by a stereoscopic shape having a size corresponding to a certain ratio of the size information.

8. The method according to claim 1, wherein the weather information includes wind speed information and wind direction information, and a visualization element indicating the wind speed information and the wind direction information are displayed in at least one of the space vector points.

9. The method according to claim 1, wherein the 3-dimensional airspace includes the first area and the second area, and colors of at least one space vector point disposed in the first area and at least one space vector point disposed in the second area are set differently.

10. The method according to claim 1, further comprising:

changing at least one of the spacings and the colors of the space vector points located in at least a partial area of the 3-dimensional airspace.

\* \* \* \* \*